Patented May 20, 1947

2,420,912

UNITED STATES PATENT OFFICE 2,420,912

PREPARATION OF ALKENYL-SUBSTITUTED CHLOROSILANES

Dallas T. Hurd, Schenectady, N. Y., assignor to General Electric Company, a corporation of New York No Drawing. Application June 11, 1945, Serial No. 598,929

4 Claims. (Cl. 260—607)

The present invention relates to the preparation of alkenyl-substituted chlorosilanes, i. e., derivatives of silane, $SiH_4$, in which at least one chlorine atom and at least one terminally unsaturated lower alkenyl radical are attached to the silane silicon atom.

Representative derivatives of silane within the scope of the present invention and their boiling points at 760 mm. are:

| | B. P. ° C. |
|---|---|
| Vinyltrichlorosilane, $(C_2H_3)SiCl_3$ | 91.5–92.5 |
| Methylvinyldichlorosilane, $(CH_3)(C_2H_3)SiCl_2$ | 92–93 |
| Divinyldichlorosilane, $(C_2H_3)_2SiCl_2$ | 117–118 |
| Allyldichlorosilane, $(C_3H_5)HSiCl_2$ | 97.5–98.5 |
| Allyltrichlorosilane, $(C_3H_5)SiCl_3$ | 117–118 |
| Diallyldichlorosilane, $(C_3H_5)_2SiCl_2$ | 83–85 (50 mm.) |

The compounds prepared in accordance with the present invention, particularly the dichloro derivatives, may be used, for example, in the preparation of polymerizable or heat-hardenable polysiloxanes such as those described and claimed in the copending application S. N. 593,928, filed concurrently herewith in the name of Dallas T. Hurd, and assigned to the same assignee as the present invention. Many of the alkenylchlorosilanes or mixtures thereof with other organosilicon halides may be used to render materials water-repellent in accordance with the process of Patnode Patent 2,306,222. They may also be employed as intermediates in the preparation of other silane derivatives either through the addition of various groups or radicals to the alkenyl radicals or by the substitution of other radicals such as the amino, alkyl, aryl, alkoxy, etc., radicals for the silicon-bonded chlorine atoms.

Various methods may be employed to produce the compounds of this invention. I have found that allyl chloride or vinyl chloride in vapor form can be reacted with heated silicon, preferably in the presence of a catalyst such as copper, to form mixtures of allyl- or vinyl-substituted chlorosilanes. This method has been found to be particularly applicable to the preparation of the allyl-substituted silanes. While there is evidence of some decomposition of the alkenyl groups during the reaction, there has been no evidence of conversion of these groups to alkyl groups. The decomposition reactions appear in general to be of the same order as those taking place in the preparation of alkyl or aryl silicon halides by reacting suitable hydrocarbon halides with heated silicon in accordance with the process broadly described and claimed in the copending application S. N. 412,459, filed September 26, 1941, in the name of Eugene G. Rochow, now Patent No. 2,380,995, issued August 7, 1945, and assigned to the same assignee as the present invention.

Alternatively the alkenylchlorosilanes can be prepared by halogenation and subsequent dehydrohalogenation of the corresponding alkylchlorosilanes.

Both of these processes are more fully described in the following illustrative examples:

Example 1

Gaseous allyl chloride was passed through a heated hard glass tube containing a powdered mixture of 90 per cent silicon and 10 per cent copper. The temperature of the silicon-copper contact mass was maintained between 200° and 400° C. Best yields of the desired reaction products appear to be obtained at temperatures of about 230–300° C. The products passing from the outlet end of the tube were condensed in a water-cooled condenser. Fractionation of the condensate yielded some unreacted allyl chloride and, as the main products of reaction, the following liquid fractions:

(a) A liquid boiling between 97.5–98.5° C./760 mm. having a specific gravity measured as about 1.086 at 27°/27°. The compound contained 50.32 per cent hydrolyzable chlorine and was found to contain silicon-bonded hydrogen by the evolution of hydrogen on reaction with dilute alkali. It was identified as being allyldichlorosilane, $(C_3H_5)HSiCl_2$, the silicon-bonded hydrogen atom apparently coming from some decomposed allyl groups.

(b) A second fraction boiling at 117–118° C. at 760 mm. and having a specific gravity measured as 1.211 at 27°/27° was found to contain 60.61 per cent hydrolyzable chlorine and reacted positively to the bromine test for unsaturation. It was identified as allyltrichlorosilane, $C_3H_5SiCl_3$. Methylation of this fraction by the Grignard reaction using methyl magnesium bromide yielded a liquid boiling at 120° C. whose specific gravity was measured as 1.057 at 27°/27°. It contained 45.33 per cent hydrolyzable chlorine and was identified by analysis as being methylallyldichlorosilane, $(C_3H_5)(CH_3)SiCl_2$.

(c) Analysis of the third liquid fraction boiling at 166° C.±1° (83–85 at 50 mm.) showed it to contain 37.82 per cent hydrolyzable chlorine and to have a positive reaction to the bromine test for unsaturation. It was identified as diallyldichlorosilane, $(C_3H_5)_2SiCl_2$. This compound was found to polymerize rapidly when heated above 150° C. in the absence of a polymerization inhibitor.

*Example 2*

A quantity of ethyltrichlorosilane was chlorinated to the alpha and beta chloroethyltrichlorosilanes by refluxing the ethyltrichlorosilane with a slight excess of sulfuryl chloride in the presence of 0.1 mol per cent benzoyl peroxide. The resultant mixed chloroethyl compounds were then slowly heated with a 30 per cent excess of quinoline to 200 degrees C. while the volatile product of the dehydrochlorination reaction distilled out of the reaction mixture. Fractionation of this distillate yielded a liquid boiling at 91.5–92.5° C. as the major product. This liquid, which had a specific gravity of 1.264 at 27°/27° and contained 65.72 per cent of hydrolyzable chlorine, was identified as vinyltrichlorosilane, $(C_2H_3)SiCl_3$.

*Example 3*

Example 2 was repeated with ethylmethyldichlorosilane in place of ethyltrichlorosilane to yield a liquid boiling at 92–93° C. as the major product. This liquid had a specific gravity of 1.085 at 25°/27° and contained 50.92 per cent of hydrolyzable chlorine. It was identified as methylvinyldichlorosilane, $(CH_3)(C_2H_3)SiCl_2$.

*Example 4*

Example 2 was repeated with diethyldichlorosilane in place of ethyltrichlorosilane to yield a liquid boiling at about 118° C., and containing 46.33 per cent of hydrolyzable chlorine. This product was divinyldichlorosilane, $(C_2H_3)_2SiCl_2$.

*Example 5*

Vinyl chloride vapor was passed over a copper-catalyzed silicon (10% Cu—90% Si) contact mass at 300–350° C. A reaction ensued and a liquid product was condensed in a water-cooled condenser. Fractionation of the condensate yielded liquid fractions boiling at about 92° C. and at 117–118° C. as the major products. These products were found to behave chemically like the vinyltrichlorosilane and divinyldichlorosilane described in Examples 2 and 4.

It is to be understood, of course, that other suitable chlorinating agents may be substituted for the sulfuryl chloride employed in chlorinating the alkyl radicals in Examples 2 and 4 and that the dehydrochlorination of the products can be effected by means of tertiary amines other than quinoline.

Likewise catalysts other than copper can be employed, or the catalyst may be omitted, in the preparation of the alkenylchlorosilanes by direct reaction of the alkenyl chloride with heated silicon. Further particulars concerning the general manner in which this reaction is carried out, the preparation of suitable metal-silicon contacts masses, etc., are more fully described in the above-mentioned Rochow application. Mixed hydrocarbon-substituted chlorosilanes can be prepared by passing a mixture of an alkenyl chloride and methyl chloride, such as a mixture of vinyl chloride and methyl chloride, over heated silicon. In such cases the products of reaction include methylchlorosilanes as well as the higher boiling methylvinylchlorosilanes and vinylchlorosilanes in proportions depending on the reaction conditions and on the relative rates of reaction of the respective chlorides with silicon. For example, by passing a mixture of methyl chloride and vinyl chloride in about 2 to 1 ratio over heated silicon in the presence of a copper catalyst at 300–350° C., there was obtained a chlorosilane product containing a substantial portion of mixed methyl vinyl and vinyl silanes boiling above 70° C., which is approximately the boiling point of the highest boiling methylchlorosilane.

What I claim as new and desire to secure by Letters Patent of the United States is:

1. The process of preparing an alkenylchlorosilane which comprises effecting reaction between heated silicon and an alkenyl chloride selected from the group consisting of vinyl chloride and allyl chloride.

2. The process of preparing an alkenylchlorosilane which comprises effecting reaction between a heated copper silicon mass and an alkenyl chloride selected from the group consisting of vinyl chloride and allyl chloride.

3. The process of preparing an allylchlorosilane which comprises effecting reaction between a heater copper-silicon mass and an allyl chloride.

4. The process of preparing a vinylchlorosilane which comprises effecting reaction between a heated copper-silicon mass and vinyl chloride.

DALLAS T. HURD.

REFERENCES CITED

The following references are of record in the file of this patent:

UNITED STATES PATENTS

| Number | Name | Date |
|---|---|---|
| 2,377,689 | Hyde | June 5, 1945 |
| 2,386,793 | Hanford | Oct. 16, 1945 |
| 2,389,802 | McGregor | Nov. 27, 1945 |
| 2,397,727 | Daudt | Apr. 2, 1946 |
| 2,398,187 | McGregor | Apr. 9, 1946 |

OTHER REFERENCES

Ushakov, Chem. Abstracts, vol. 32 (1938), page 2083.

Andrianov, Chem. Abstracts, vol. 33 (1939), page 1266.